Patented Jan. 14, 1947

2,414,206

UNITED STATES PATENT OFFICE 2,414,206

CONVERSION OF HYDROCARBONS

Edwin T. Layng, Jersey City, N. J., assignor to The Polymerization Process Corporation, Jersey City, N. J., a corporation of Delaware No Drawing. Application December 30, 1942, Serial No. 470,687

15 Claims. (Cl. 260—671)

This invention relates to improvements in catalytic conversion processes which involve the activation of olefin hydrocarbons. Such processes include the polymerization of olefin hydrocarbons and the alkylation of iso-paraffin and cyclic hydrocarbons by means of olefin hydrocarbons.

The invention relates particularly to improvements in processes which involve the activation of olefin hydrocarbons by means of catalysts comprising certain metal pyrophosphates as the essential active ingredients. Certain metal prophosphates, particularly those of copper and mercury but including also the pyrophosphates of zinc, magnesium, iron, aluminum and cobalt, are capable of promoting the polymerization of olefin hydrocarbons and alkylation reactions involving olefin hydrocarbons such as the alkylation of aromatic hydrocarbons by means of olefin hydrocarbons.

Such pyrophosphates may be employed in the form of granules consisting essentially only of the pyrophosphate but preferably they are employed in the form of granules or pellets which comprise one or more of the pyrophosphates in combination with suitable supporting material. In combining the active pyrophosphates with supporting material in this manner it is necessary to avoid the use of certain natural materials which have been employed generally as catalyst supports. These include silica, kieselguhr, alumina, clay, etc. In general the use of metals or oxides of metals, particularly those of the alkali and alkaline earth series should be avoided. This care in the selection of supporting materials is made necessary by the manner in which the above-mentioned pyrophosphates become active. Each of the pyrophosphates mentioned above becomes active for the promotion of the hydrocarbon conversion reactions by the formation therein, under the conversion conditions, of an active modification which is probably the true catalyst for the reaction. Consequently in the selection of a supporting material it is necessary to avoid the use of those materials which would react with the active modification of the pyrophosphate and thus depress the activity of the catalyst mass as a whole. Materials which have been found suitable for use as supporting materials for the pyrophosphates include the normal and acid salts of the various phosphoric acids which are not substantially reducible under the conversion conditions, such as the phosphates of calcium, strontium, barium, titanium, zirconium, cerium, thorium, silicon and germanium, tin and lead. Other materials include suitable salts such as the sulphates of barium and calcium.

However, it is found that carbonaceous materials are particularly suitable as supporting materials because of their stability under the conditions of operation and relative porosity and the ease with which they may be obtained as, or formed into, granules of the desired size and porosity. Suitable materials include various charcoals and cokes as well as materials which may be converted by relatively mild heating to the desired non-volatile form such as petroleum residues and asphalts. However, carbonaceous materials formed by the charring of woods or other organic materials such as finely divided wood charcoals, particularly in an activated form, are preferred for the purpose provided that they do not contain large amounts of free alkali or alkaline salts.

A particularly suitable form of catalytic material of the character described above may be prepared by the formation of pellets comprising an intimate mixture of an active pyrophosphate and finely divided wood charcoal. The preparation of such catalytic material is described in application Serial No. 321,521, filed February 29, 1940, which issued on February 2, 1943, as Patent No. 2,310,161. Catalytic material thus prepared is capable of activating olefin hydrocarbons in catalytic conversion processes involving long operating runs resulting in a yield of product per unit quantity of catalyst which is sufficiently large to render it more economical to replace the used catalyst at the end of each operating run with fresh catalyst than to regenerate or reactivate the used catalyst. At the end of each operating run, therefore, the used catalyst is removed from the reactor and replaced with fresh material.

At the end of such long operating runs it is found frequently that the granular catalyst mass has set into a rigid structure which is difficult to remove from the catalyst chamber. Alternatively, the catalyst is sometimes found as a plastic or sticky mass, the exact condition being a function of a history of the use of the material. These conditions result apparently in part from changes in the chemical and physical state of the catalyst which form liquids which cause the catalyst granules to adhere. If the granules are in the form of compressed pellets the liquids may cause swelling which promotes adherence. Adherence of the granules to each other is promoted also by the cementing action of highly polymerized materials which accumulate on the surfaces of the catalyst granules during the operating run. The setting of the granular mass in this manner presents a particularly difficult task of removing it from reactors in which the catalyst mass is contained in elongated tubular chambers.

The effects which promote setting of the catalyst mass also tend to limit the length of the operating run. The formation of liquids by the changes in the chemical state of the catalyst softens molded catalyst pellets. This may cause swelling and deformation of the catalyst pellets with the result that the mass becomes unduly consolidated and presents too great resistance to the flow of the reactants therethrough. Softening of molded pellets is promoted also by the accumulation of polymerized hydrocarbons, which also reduce the activity of catalyst granules of whatever nature by blanketing the active centers.

In this important application of the invention the difficulties attendant upon the removal of the used catalyst from the reactor are eliminated, and a greater yield of useful product per unit of catalyst is achieved, by employing as the consolidated granular mass in the reactor a mechanical mixture of the granular catalyst and granular material which is substantially inactive catalytically. The volumetric ratio of the granular catalytic material to the granular substantially non-catalytic material may vary from 1:1 to 5:1 but the preferred ratios are from 2:1 to 3:1. The non-catalytic granular material conveniently is approximately of the same granular dimension as the granular catalytic material to facilitate the intimate mixing thereof with the catalytic material.

Apparently the granular non-catalytic spacer material aids the conversion operation by strengthening the catalyst mass as a whole whereby slumping and excessive consolidation of the mass are minimized and by preventing channeling of the reactants in the catalyst mass. The spacer material also assists the reaction by acting as an absorbent for liquids which are formed in the reaction zone. During the reaction the pyrophosphate catalytic material undergoes chemical change with the formation of liquids which may be catalytically active. In addition liquids are formed in the reaction zone as the result of polymerization of the olefin reactants to relatively high boiling products. The absorption of these various liquids by the non-catalytic spacer assists in retarding adherence of the catalyst granules and setting of the catalyst mass and furthermore minimizes blanketing of active centers of the catalytic material by the high boiling polymers. The retention of these tarry polymers by the granular spacer material reduces the amount of such polymers in the liquid product and improves the color of the latter.

The materials which are useful as the non-catalytic spacer materials include in general the same materials which are chemically suitable for use as supporting material for the pyrophosphates as described above. However, such material must occur naturally as, or be preformed into, granules of substantially the dimensions of the granular or pelleted catalytic material. This requires the granulation of materials such as the phosphates and other salts mentioned above as supporting materials. It is preferred to employ granular charcoal or other suitable granular carbonaceous material. Granular charcoal is particularly suitable also because of its relatively high capacity for the absorption and retention of liquids and good mechanical strength. For example in the polymerization of olefin hydrocarbons, such as a refinery mixture including $C_3$ and $C_4$ olefin hydrocarbons, it is found that the employment of a mixture of three parts by volume of granular catalytic material comprising copper pyrophosphate in intimate mixture with finely divided charcoal and one part by volume of granular charcoal results in the attainment of a greater yield of useful product per unit of catalytic material employed as compared to the results obtained by the use of the granular catalytic material alone and at the end of the operating run, which is reached when the degree of conversion reaches a pre-determined minimum, the catalyst mass is removed from the reactor in a relatively short time without difficulty. While highly activated charcoals, such as cocoanut charcoal, are quite satisfactory such highly activated materials are not necessary and only slightly activated charcoal has been found to be quite satisfactory.

The substitution of such a mixed granular catalyst mass for one consisting entirely of the granular catalytic material in a reactor while charging hydrocarbons to the reactor at the same rate results in a substantial increase in the actual space velocity of the operation because of the decreased volume of the space in the reactor actually occupied by catalytic material. In order to maintain the degree of conversion at the same rate it may be desirable in some instances to increase the reaction temperature slightly if this does not substantially alter the character of the liquid product obtained.

The substitution of the improved catalyst mass, comprising a mixture of the catalyst granules with a substantial proportion of granules of the non-catalytic spacer material, for a catalyst mass of the same volume consisting entirely of the granular catalytic material, and the passage of the reactants through the catalyst mass at the same rate as before such substitution, may result in a slightly more rapid deactivation of the catalyst because of the increase in space velocity, expressed in terms of volume of reactants per unit volume of actual catalyst space. Under such circumstances the conversion rate may decline to the predetermined minimum in a shorter time whereby the operating run must be terminated in a shorter time. However, it has been found in practise that the substitution of the mixed granular mass as described above results generally in a longer operating run, presumably because of the effect of the porous spacer material in absorbing and retaining liquids which might otherwise blanket the active surfaces of the catalytic material. In all cases, however, whether the operating run is lengthened or shortened by the new method, the yield of useful product per unit of catalyst employed is increased because of the effect of the porous spacer in maintaining the activity of the catalyst.

Preferably sufficient reactor space is provided to accommodate the spacer material while leaving a remaining catalyst space sufficiently large to permit charging the reactants at the desired rate while maintaining the desired space velocity. In any case the yield of useful product per unit of catalytic material is increased and the increased number of catalyst change-overs which may result from shortening the operating run is compensated for by the substantial decrease in the time required for cleaning the reactor in each change-over.

A further advantage of the use of the spacer material results from its effect in minimizing over-heating of the catalyst as the result of the exothermic heat of reaction. As the reactants pass through the reaction zone they pass through a zone of maximum temperature which results from contact of a relatively high concentration of olefin reactants with a body of relatively fresh catalytic material. As the catalytic material which is contacted by the highest concentration of reactants becomes deactivated the concentration of reactants in contact with a succeeding mass of catalysts is increased due to the lowered degree of conversion which occurs during the flow of the reactants over the deactivated catalyst. Consequently, there is, throughout the operating run, a zone of maximum conversion and maximum temperature which proceeds from the point adjacent the entrance of the reactor to a point adjacent the exit thereof. Such concentrations of the heat generated by the exothermic reaction are deleterious since they promote production of tarry material, degradation of the catalyst granules and the setting of the consolidated mass into a rigid structure. The inclusion of the granular non-catalytic material in the catalyst mass in accordance with this invention minimizes the maximum temperature reached in the reaction mass by enlarging the zone in which reaction occurs principally and by providing heat adsorptive material at the zone of maximum temperature which adsorbs heat and assists in its transfer from the zone of maximum temperature. In this manner overheating of the catalyst is minimized and the useful life of the catalyst is lengthened.

As mentioned above carbonaceous materials are preferred as the non-catalytic granular material since they may be obtained in the desired granular form without the necessity of pelleting or extrusion. While coke from the carbonization of coal or petroleum may be employed it is less desirable than charcoal since the coke may contain substantial quantities of sulphur which may contaminate the hydrocarbon product. Coke produced by the carbonization of coal may have the further disadvantage that it contains residual or ash-like materials which are reactive with the pyrophosphate and its reduction products in the manner described above. Granular charcoal is, therefore, preferred although the use of other suitable granular or pelleted carbonaceous materials is not excluded.

The granular spacer material should be sufficiently coarse to preserve in the catalyst mass the desired permeability, but the use of granular sizes larger than necessary is undesirable since the advantages of the inclusion of this material in the catalyst mass are realized to the fullest degree when the spacer is distributed most uniformly throughout the catalyst mass. Conveniently the spacer material may be of approximately the granular size of the catalyst granules or pellets although this is not essential. For example, when employing catalytic material comprising an intimate mixture of copper pyrophosphate and finely divided charcoal which has been extruded as ⅜ inch cylinders and broken into about ⅜ inch length, granular charcoal having an average diameter of approximately ¼ inch to ½ inch has been found to be satisfactory as to size. Material of this size is obtained in screening operations by selecting the material which passes through a 2-mesh vibrating screen, but is retained upon a 4-mesh screen. When using this combination of granular material a ratio of three volumes of the catalyst granules to one part of the charcoal has been found to be satisfactory.

The reaction conditions employed when using a catalyst mass containing substantially non-catalytic spacer material in accordance with this invention are substantially like the reaction conditions which are employed when using a similar catalytic material without the inclusion of the non-catalytic granular material in the catalyst mass. However, certain adjustments in the temperature and space velocity may be required to compensate for the difference between the volume of the catalyst mass and the space actually occupied by the catalytic material. In the polymerization of olefin hydrocarbons any suitable pressure may be used but it is preferred to employ relatively high pressure, for example in excess of 150 pounds per square inch, although atmospheric pressure or lower pressures may be employed. The reaction temperature depends somewhat upon the nature of the material under treatment of the product desired. In the conversion of gaseous olefins, such as butylenes and propylene, temperatures of 300 to 500° F. may be employed. In the conversion of hydrocarbon gases the hydrocarbon should be passed over the contact material at a rate of 2 to 50 cu. ft. (measured as gas at standard conditions of temperature and pressure) per pound of catalytic material per hour. Otherwise expressed the hydrocarbon reactants should be passed through the reactor at a rate of 50 to 6000 volumes per hour per volume of the catalyst mass. However, the space velocity is governed also by the degree of conversion desired. In a treatment of gaseous mixture containing isobutylene it may be desirable to operate at a relatively high space velocity to limit the extent of conversion to the co-polymerization of iso-butylene or the inter-polymerization of iso-butylene and normal butylenes.

The activation of olefinic hydrocarbons in other condensation reactions is carried out suitably at somewhat the same conditions as are employed in the polymerization reaction. In the propylation of aromatic hydrocarbons the above ranges of conditions of temperature, pressure and space velocity are satisfactory. For example in the propylation of benzene the mixture of benzene, propylene and accompanying inert hydrocarbons may be passed over the catalyst mass under a pressure of 900 pounds per square inch at a temperature of 400 to 450° F. and at a rate of 11 cu. ft. per hour per pound of catalytic material (exclusive of spacer). In alkylation treatments it is desirable also that the hydrocarbon to be alkylated by the olefin be present in the reaction zone in substantial excess in order to minimize co-polymerization of the olefin reactants. In the alkylation of aromatic hydrocarbons by means of olefin hydrocarbons the mol ratio of aromatic to olefin hydrocarbons should be in excess of 1:1 and preferably should be 5:1 or higher.

Another application of the invention involves the employment of spacer materials in connection with the activation of olefin hydrocarbons by means of solid catalysts comprising phosphoric acid as the essential active ingredient. Such catalysts are prepared by impregnating suitable supporting material such as carbonaceous granules with phosphoric acid which may be in either the ortho or pyro form or by the compounding of the phosphoric acid with siliceous materials, such as kieselguhr and clays which are reactive with a portion of the phosphoric acid. Such reaction provides a substantially porous mass of the reaction product of the binder and phosphoric acid which acts as a support for the remainder of the phosphoric acid, the latter constituting the essential active ingredient of the catalyst. The manner in which such solid phosphoric acid catalysts are combined with the spacer material and employed for activating olefin hydrocarbons is substantially the same as that described above in connection with the pyrophosphate catalyst. In connection with such solid phosphoric acid catalysts the spacer material functions to strengthen the catalyst mass as a whole, to absorb liquids, such as phosphoric acid and heavy polymers, to permit great yield of useful product per unit of catalyst employed and to permit easy removal of the catalyst mass from the reactor at the end of the operating run.

The granular spacer material used with solid catalysts comprising phosphoric acid as the essential active ingredient are substantially those which are satisfactory for use with the pyrophosphate catalyst. In general carbonaceous materials are to be preferred because they are available in a granular porous form and are substantially non-reactive with the phosphoric acid. However, other suitable materials which are non-reactive with the phosphoric acid may be employed.

The granular spacer material and granular catalyst may be mixed sufficiently by charging them to the reaction zone simultaneously or these materials may be mixed outside the reactor before charging the reactor. Alternatively the spacer and catalyst granules may be arranged in the reactor as alternate relatively thin layers extending transversely to the path of flow of the reactants. This arrangement can be secured by charging alternate quantities of spacers and catalyst to the reactor. With any of the above operations it may be desirable to provide larger bodies of the granular spacer material at one or more places in the reactor. For example, a substantial layer of granular spacer material may be placed at the bottom of the reaction zone or in the bottoms of a plurality of elongated tubular reaction zones.

I claim:

1. The method for activating olefin hydrocarbons in condensation reactions which comprises passing the hydrocarbons which enter into the condensation reactions, under suitable reaction conditions of temperature, pressure and space velocity, through a consolidated granular mass essentially consisting of an intimate mixture of catalyst granules and spacer granules, said catalyst granules being in physical non-adhering contact with said spacer granules, each of said catalyst granules comprising an intimate mixture of a metal pyrophosphate capable of reduction to a catalyst for said condensation reactions and finely divided supporting material therefor, and each of said spacer granules being composed of material which is non-reactive with the reduction products of said pyrophosphate.

2. The method for activating olefin hydrocarbons in condensation reactions which comprises passing the hydrocarbons which enter into the condensation reactions, under suitable reaction conditions of temperature, pressure and space velocity, through a consolidated granular mass essentially consisting of an intimate mixture of catalyst granules and spacer granules, said catalyst granules being in physical non-adhering contact with said spacer granules, each of said catalyst granules comprising an intimate mixture of copper pyrophosphate and finely divided supporting material therefor, and each of said spacer granules being composed of material which is non-reactive with the reduction products of said copper pyrophosphate.

3. The method for activating olefin hydrocarbons in condensation reactions which comprises passing the hydrocarbons which enter into the condensation reactions, under suitable reaction conditions of temperature, pressure and space velocity, through a consolidated granular mass essentially consisting of an intimate mixture of catalyst granules and spacer granules, said catalyst granules being in physical non-adhering contact with said spacer granules, each of said catalyst granules comprising an intimate mixture of a metal pyrophosphate capable of reduction to a catalyst for said condensation reactions and a finely divided supporting material therefor, and each of said spacer granules being composed of carbonaceous material.

4. The method of activating olefin hydrocarbons in condensation reactions which comprises passing the hydrocarbons which enter into the condensation reactions, under suitable reaction conditions of temperature, pressure and space velocity, through a consolidated granular mass essentially consisting of an intimate mixture of catalyst granules and spacer granules, said catalyst granules being in physical non-adhering contact with said spacer granules, each of said catalyst granules comprising an intimate mixture of a metal pyrophosphate capable of reduction to a catalyst for said condensation reactions and a finely divided supporting material therefor, and each of said spacer granules being composed of charcoal.

5. The method for activating olefin hydrocarbons in condensation reactions which comprises passing the hydrocarbons which enter into the condensation reactions, under suitable reaction conditions of temperature, pressure and space velocity, through a consolidated granular mass essentially consisting of an intimate mixture of catalyst granules and spacer granules, said catalyst granules being in physical non-adhering contact with said spacer granules, each of said catalyst granules comprising an intimate mixture of a metal pyrophosphate capable of reduction to a catalyst for said condensation reactions and finely divided carbonaceous supporting material, and each of said spacer granules being composed of material which is non-reactive with the reduction products of said metal pyrophosphate.

6. The method for activating olefin hydrocarbons in condensation reactions which comprises passing the hydrocarbons which enter into the condensation reactions, under suitable reaction conditions of temperature, pressure and space velocity, through a consolidated granular mass essentially consisting of an intimate mixture of catalyst granules and spacer granules, said catalyst granules being in physical non-adhering contact with said spacer granules, each of said catalyst granules comprising an intimate mixture of a metal pyrophosphate capable of reduction to a catalyst for said condensation reaction and finely divided carbonaceous supporting material, and each of said spacer granules being composed of carbonaceous material.

7. The method for activating olefin hydrocarbons in condensation reactions which comprises passing the hydrocarbons which enter into the condensation reactions, under suitable reaction conditions of temperature, pressure and space velocity, through a consolidated granular mass essentially consisting of an intimate mixture of catalyst granules and spacer granules, said catalyst granules being in physical non-adhering contact with said spacer granules, each of said catalyst granules comprising an intimate mixture of copper pyrophosphate and finely divided carbonaceous supporting material, and each of said spacer granules being composed of carbonaceous material.

8. The method for activating olefin hydrocarbons in condensation reactions which comprises passing the hydrocarbons which enter into the condensation reactions, under suitable reaction conditions of temperature, pressure and space velocity, through a consolidated granular mass essentially consisting of an intimate mixture of catalyst granules and spacer granules, said catalyst granules being in physical non-adhering contact with said spacer granules, each of said catalyst granules comprising an intimate mixture of copper pyrophosphate and finely divided charcoal, and each of said spacer granules being composed of charcoal.

9. The method for activating olefin hydrocarbons in condensation reactions which comprises passing the hydrocarbons which enter into the condensation reactions, under suitable reaction conditions of temperature, pressure and space velocity, through a consolidated granular mass essentially consisting of an intimate mixture of catalyst granules, each comprising an intimate mixture of copper pyrophosphate and finely divided charcoal, and spacer granules of charcoal, in proportions of 1 to 5 parts by volume of the catalyst granules to each part by volume of the spacer granules.

10. The method for activating olefin hydrocarbons in condensation reactions which comprises passing the hydrocarbons which enter into the condensation reactions, under suitable reaction conditions of temperature, pressure and space velocity, through a consolidated granular mass essentially consisting of an intimate mixture of catalyst granules and spacer granules, said catalyst granules being in physical non-adhering contact with said spacer granules, the average diameter of the catalyst granules being substantially of the same order of magnitude as that of the spacer granules, each of said catalyst granules comprising an intimate mixture of a metal pyrophosphate capable of reduction to a catalyst for said condensation reactions and finely divided supporting material therefor, and each of said spacer granules being composed of material which is non-reactive with the reduction products of said metal pyrophosphate.

11. The method for activating olefin hydrocarbons in condensation reactions which comprises passing the hydrocarbons which enter into the condensation reactions, under suitable reaction conditions of temperature, pressure and space velocity, through a consolidated granular mass essentially consisting of an intimate mixture of catalyst granules and spacer granules, said catalyst granules being in physical non-adhering contact with said spacer granules, substantially all granules of said mass having an average diameter within the range of ¼ inch to ½ inch, each of said catalyst granules comprising an intimate mixture of a metal pyrophosphate capable of reduction to a catalyst for said condensation reactions and finely divided supporting material therefor, and each of said spacer granules being composed of material which is non-reactive with the reduction products of said metal pyrophosphate.

12. The method for polymerizing olefin hydrocarbons which comprises passing said olefin hydrocarbons at elevated temperature through a consolidated granular mass essentially consisting of an intimate mixture of catalyst granules and spacer granules, said spacer granules being in physical non-adhering contact with said catalyst granules, said catalyst granules comprising an intimate mixture of a metal pyrophosphate capable of reduction to a catalyst for said polymerizing reaction and finely divided supporting material therefor, and said spacer granules being composed of material which is non-reactive with the reduction products of said metal pyrophosphate.

13. The method for alkylating aromatic hydrocarbons which comprises passing said aromatic hydrocarbons and olefin hydrocarbons at elevated temperature through a consolidated granular mass essentially consisting of an intimate mixture of catalyst granules and spacer granules, said spacer granules being in physical non-adhering contact with said catalyst granules, said catalyst granules comprising an intimate mixture of a metal pyrophosphate capable of reduction to a catalyst for said alkylating reaction and finely divided supporting material therefor, and said spacer granules being composed of material which is non-reactive with the reduction products of said metal pyrophosphate.

14. The method for alkylating benzene with propylene which comprises passing said benzene and propylene at elevated temperature through a consolidated granular mass essentially consisting of an intimate mixture of catalyst granules and spacer granules, said spacer granules being in physical non-adhering contact with said catalyst granules, said catalyst granules comprising an intimate mixture of a metal pyrophosphate capable of reduction to a catalyst for said alkylating reaction and finely divided supporting material therefor, and said spacer granules being composed of material which is non-reactive with the reduction products of said metal pyrophosphate.

15. The method for alkylating benzene with propylene which comprises passing said benzene and propylene at elevated temperature through a consolidated granular mass essentially consisting of an intimate mixture of catalyst granules and spacer granules, said spacer granules being in physical non-adhering contact with said catalyst granules, said catalyst granules comprising an intimate mixture of copper pyrophosphate and finely divided charcoal, and each of said spacer granules being composed of charcoal.

EDWIN T. LAYNG.